Figure 1:
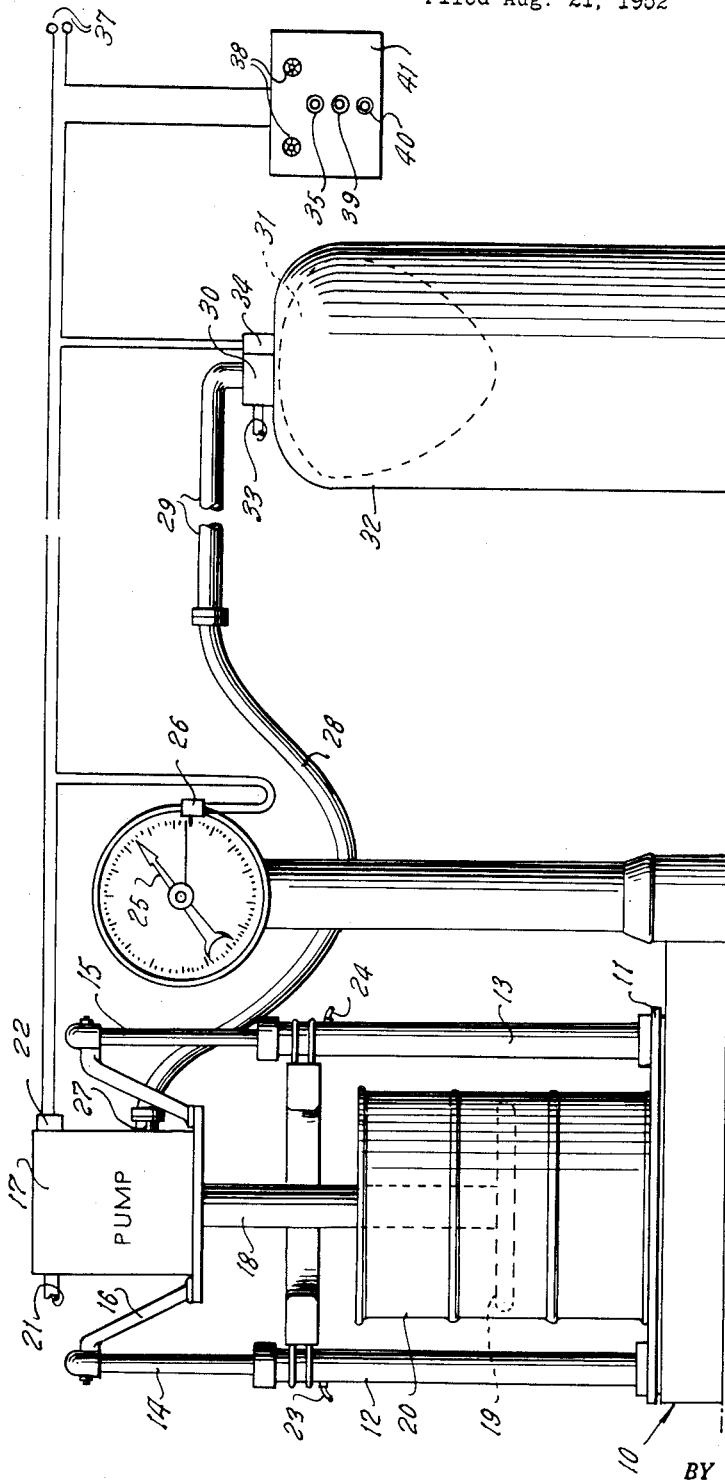

June 26, 1956  F. O. HAILE  2,752,118
MATERIAL HANDLING SYSTEMS
Filed Aug. 21, 1952

FRANK O. HAILE
INVENTOR.

BY *Hastings Ashley*

ATTORNEY

United States Patent Office 2,752,118
Patented June 26, 1956

2,752,118

MATERIAL HANDLING SYSTEMS

Frank O. Haile, Dallas, Tex.

Application August 21, 1952, Serial No. 305,605

4 Claims. (Cl. 249—7)

This invention relates to a material handling system and more particularly to a system for removing measured quantities of plastic material from a container and delivering such measured quantities of the plastic material to a location remote from the container.

In many applications, it is necessary to remove measured quantities of a plastic material from a container and delivering such measured quantities of the plastic material to a location remote from the container. For example, lard or shortening is usually delivered to bakeries in large steel drums. During dough mixing operations, measured quantities of the lard must be removed from the drum and delivered to the mixing bowl of a mixing machine where the lard is mixed with other ingredients to form a dough. Since many batches of dough are mixed consecutively by a single mixing machine, pumps have been designed to draw the lard from the drum and feed it to a container on the platform of a scale which automatically stops the pump when the desired predetermined amount of lard is pumped into the container on the scale, the scale weighing the amount. The scale resets automatically so that the next time the pump is started, the scale will again automatically stop the pump when the predetermined amount of lard is again pumped into a container on the scale. The container must be taken off the scale and the lard dropped from the container into the mixing bowl of the mixing machine. This latter step requires considerable effort where large quantities of lard must be lifted and requires the scraping of the container to remove all lard from the container into the mixing bowl and provides opportunities for contamination of the lard. It is desirable, therefore, to provide a material handling system by means of which predetermined measured quantities of lard can be pumped directly from the drum into the mixing bowl without intermediate handling.

Accordingly, it is an object of the invention to provide a new and improved material handling system.

It is another object of the invention to provide a new and improved system for removing predetermined amounts of material from a container and delivering it to a point remote from the container.

It is still another object of the invention to provide a new and improved system for removing predetermined amounts of shortening from a drum and delivering them directly to a mixing bowl without intermediate handling.

Briefly stated, the material handling system includes a platform scale having a movable platform on which a pump is mounted for removing shortening from a drum also mounted on the movable platform. The pump draws the shortening from the drum and pumps it through a conductor into the mixing bowl of a mixing machine. An electrically controlled valve at the end of the conductor is provided to stop the flow of lard into the mixing bowl each time the pump is stopped. A control circuit is provided which includes a push button switch for starting the pump and opening the valve and a microswitch, photoelectric or similar switch operable by the interceptor arm of the scale when the predetermined amount of shortening has been pumped out of the drum for stopping the pump and closing the valve. The scale is provided with an automatic resetting mechanism so that the next time the push button switch is closed, the same predetermined quantity of shortening will be pumped from the drum into the mixing bowl.

Figure 2:
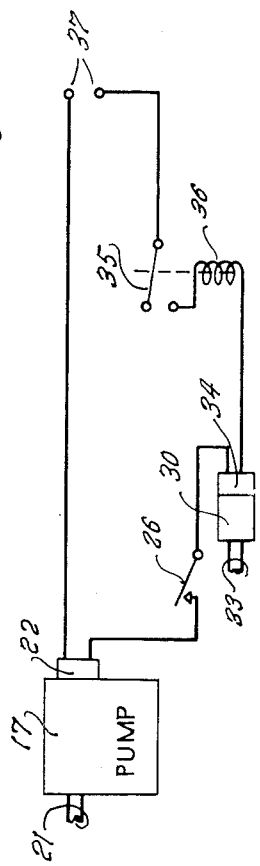

Additional objects and advantages of the invention will be readily apparent from the reading of the following description of a device constructed in accordance with the invention, and reference to the accompanying drawings thereof, wherein:

Figure 1 is a simplified side plan view of the system for successively pumping predetermined amounts of plastic material from a drum to the mixing bowl of a mixing machine, and Figure 2 is a schematic illustration showing one manner in which the push button switch and the microswitch scale interceptor switch may be connected to control operation of the pump and of the valve.

Referring now to the drawings, the system there illustrated includes a platform scale 10 having a movable platform 11 on which are mounted a pair of spaced vertical cylindrical columns 12 and 13. A pair of rods or pistons 14 and 15 are slidingly telescoped in the columns 12 and 13, respectively, and support a connecting cross member 16. A pneumatically operated pump 17 is mounted on the cross member and has a dependent intake conductor 18 to whose lower end is secured an annular floating head 19. The floating head is of substantially the same diameter as the bore of the drums 20 which contain the shortening. The pump 17 is supplied with compressed air through a conductor 21 and is started and stopped by a solenoid 22 or other suitable control means. The pump may be raised and lowered by admitting and releasing compressed air into and from the cylindrical columns through the conductors 23 and 24.

The pump removes shortening from the drum 20 which is also placed on the movable scale platform 11. The pump and floating head 19 are raised above the top of the drum and then allowed to descend until the floating head rests upon the shortening in the drum. The floating head then follows the upper surface of the shortening and descends in the drum with the top level of the shortening as such level drops as the shortening is pumped out. The outer edges of the floating head abut and wipe the sides of the drums and insure that little if any shortening is left adhering to the sides of the drum.

The scale 10 has the usual interceptor arm 25 which is adapted to open a mercury or microswitch 26 or intercept a light beam to a photo-electric cell when the desired amount of shortening has been pumped out of the drum and the interceptor arm has pivoted through a preset arc as the desired amount of shortening was removed and lightened the weight resting on the movable platform.

The scale 10 is provided with suitable control means which automatically reset the scale to insure that in succeeding pumping operations, the same predetermined amounts of shortening are pumped out before the interceptor arm 25 opens the microswitch 26 and stops operation of the pump.

The pump 17 and the scale 10 provided with the automatic tare reset and with the interceptor arm operated microswitch control are conventional devices and, therefore, will not be described in detail.

The shortening moved by the pump 17 is forced through its outlet 27 to a flexible conductor 28 which connects the pump outlet to a pipe 29. The pipe 29 is connected through a pneumatically powered solenoid controlled valve 30 to the crown of the mixing bowl 31 of a mixing machine 32. The valve 30 is powered by compressed air which is directed to the valve through a conductor 33.

The solenoid 34 permits the valve to be opened when it is connected to a source of current and closes the valve when it is disconnected therefrom. The valve 30 is employed to prevent any shortening present in the pipe 29 from flowing from the pipe into the mixing bowl when the pump is not in operation.

The solenoids 22 and 34 which control the pump 17 and the valve 30, respectively, are so connected that when a push button switch 35 is actuated, both solenoids are energized so that the pump 17 is started and the valve 30 is opened, shortening then being pumped from the drum and into the mixing bowl. The microswitch 26 is so connected in the circuit with these solenoids that when it is opened by the interceptor arm 25, both solenoids are de-energized, the pump 17 being stopped and the valve 30 being closed. This sequence of operations is repeated each time the push button switch is closed.

This desired simultaneous operation of the solenoids 22 and 24 may be obtained by connecting the solenoid 22, the normally-closed microswitch 26, the solenoid 34, the holding coil 36 and the normally-open push button switch 35 in series across the source of current 37. If the push button switch 35 is now closed, current will flow through the holding coil to hold the switch 35 in closed position, through the solenoid 34 to hold the valve 30 open and allow shortening to move from the pipe 29 through the valve 30 into the mixing bowl, through the microswitch 26 and through the solenoid 22 to start the pump and maintain it in operation. When the interceptor arm 25 opens the microswitch 26, the solenoids and the holding coil are deenergized with the result that the pump is stopped, the valve is closed and the push button switch 35 moves to open position.

It will be apparent that this control circuit has been given for illustrative purposes only and that various modifications of the circuit may be made. For example, pilot lights 38 may be connected in the circuit to indicate when the pump and valve are operating. Also, the scale reset switches 39 and 40 and their associated circuits, which are conventional, may be located on the same control panel 41 as the switch 35. The control panel may be located adjacent the mixing machine. Also, the control circuit may be gas or hydraulic fluid operated rather than electrical throughout.

In use, the scale 10 is preferably placed in the storeroom in which the drums 20 of shortening are stored. The flexible conductor 28 and pipe 29 are led into the room in which the mixing machine 32 is located. It will be readily apparent that the two rooms may be a considerable distance apart. The control panel is located adjacent the mixing machine.

A drum 20 is then placed on the movable platform of the scale 10 and the floating head 19 of the pump is positioned on top of the shortening in the drum. The flexible conductor and pipe 29 are assumed to be full of shortening pumped from a preceding drum.

The push button switch 37 is then closed and the pump 17 moves shortening from the drum through the flexible conductor 28, the pipe 29 and the open valve 30 directly into the mixing bowl. As the pumping continues, the total weight on the platform 11 of the scale decreases and the interceptor arm 25 of the scale moves accordingly until it opens the microswitch 26 when a predetermined amount of shortening has been pumped out of the drum 20. The pump will then be stopped and the valve 30 will be closed. This sequence of operations will be repeated each time the push button 35 is closed.

It will now be apparent that a material handling system has been illustrated and described which permits predetermined amounts of shortening to be pumped by a pump 17 supported on the movable platform 11 of a scale from a drum or container 20 also supported on the movable platform. It will also be apparent that the predetermined amounts of shortening may be delivered directly from the drum 20 to the mixing bowl 31 without any intermediate handling, this effecting more sanitary mixing conditions and considerable saving in time and effort over conventional methods of material handling which involve the pumping of the lard into a container on a scale and then dumping the material from the container into the mixing bowl. It will further be seen that the shortening flowing into the mixing bowl is controlled immediately adjacent such mixing bowl by the pneumatically operated valve 30 so that accurate measuring of shortening is obtained. Also, the system permits a single operator to run the mixer and fill the same with shortening and other ingredients, thus reducing labor costs.

The foregoing description of the invention is explanatory only, and changes in the details of the construction illustrated may be made by those skilled in the art, within the scope of the appended claims, without departing from the spirit of the invention.

What I claim and desire to secure by Letters Patent is:

1. A shortening handling system for delivering shortening to a mixing bowl including, an automatically resetting platform scale having a movable platform, a pump mounted on the movable platform for pumping shortening from a drum placed on the movable platform, a conduit connected to the pump and having an outlet communicating with the mixing bowl for delivering material pumped from the drum to the mixing bowl, a valve for closing the conduit at its outlet end adjacent the mixing bowl, control means for simultaneously starting the pump and opening the valve, and control means operable by the scale for stopping the pump and closing the valve to completely shut off flow through and from said conduit when a predetermined amount of shortening has been pumped from the drum on the movable platform, said control means being set to stop said pump and close said valve at predetermined batch withdrawals of fixed amounts determined by reduction of weight of shortening in the drum by such fixed amounts.

2. A shortening handling system for delivering shortening to a mixing bowl including, an automatically resetting platform scale having a movable platform, a pump mounted on the movable platform for pumping shortening from a drum placed on the movable platform, a conduit connected to the pump and having an outlet communicating with the mixing bowl for delivering material pumped from the drum to the mixing bowl, a valve for closing the conduit at its outlet end adjacent the mixing bowl, electrical means for controlling operation of the pump and valve, switch means for simultaneously energizing said electrical means to start operation of said pump and open said valve, and switch means operable by the scale for simultaneously stopping the pump and closing the valve to completely shut off flow to and from said conduit when a predetermined amount of shortening has been pumped from the drum on the movable platform, said control means being set to stop said pump and close said valve at predetermined batch withdrawals of fixed amounts determined by reduction of weight of shortening in the drum by such fixed amounts.

3. A material handling system for delivering shortening to a mixing bowl including, an automatically tare resetting platform scale having a movable platform and an interceptor arm movable in accordance with said movable platform, a pump mounted on the platform for pumping shortening from a container placed on the movable platform, a conduit connected to the pump for carrying shortening pumped from the container to the mixing bowl, a valve for closing said conduit at said point, control means for simultaneously starting the pump and opening the valve, and control means operable by the interceptor arm for stopping the pump and closing the valve to completely shut off flow to and from said conduit when a predetermined amount of shorting has been pumped from the container on the movable platform, said control means being set to stop said pump and close said valve at predetermined batch withdrawals of fixed amounts determined by reduction of weight of the material in the container by such fixed amounts.

4. A material handling system for delivering shortening to a mixing bowl including, an automatically tare resetting platform scale having a movable platform and an interceptor arm movable in accordance with said movable platform, a pump mounted on the platform for pumping shortening from a container placed on the movable platform, a conduit connected to the pump for carrying shortening pumped from the container to the mixing bowl, electrical means for controlling operation of said pump and valve, switch means for simultaneously energizing said electrical means to start operation of said pump and to open said valve, and switch means operable by said interceptor arm for simultaneously stopping the pump and closing the valve when a predetermined amount of shortening has been pumped from the container on the movable platform.

References Cited in the file of this patent

UNITED STATES PATENTS

| | | |
|---|---|---|
| 1,536,589 | Keen | May 5, 1925 |
| 2,273,180 | De Castro | Feb. 17, 1942 |
| 2,332,438 | Clifford | Oct. 19, 1943 |
| 2,372,746 | Stock | Apr. 3, 1945 |
| 2,434,177 | Richardson | Jan. 6, 1948 |
| 2,544,155 | Harkenrider | Mar. 6, 1951 |
| 2,549,908 | Johansen | Apr. 24, 1951 |
| 2,594,975 | Mytling | Apr. 29, 1952 |
| 2,596,220 | Dodds | May 13, 1952 |